UNITED STATES PATENT OFFICE.

ROBERT B. WOLF, OF BERLIN, NEW HAMPSHIRE.

PROCESS OF MAKING TIGHT CASTINGS.

1,214,630.  Specification of Letters Patent.  Patented Feb. 6, 1917.

No Drawing.  Application filed March 4, 1914. Serial No. 822,378.

Having thus explained my invention, what I claim is:—

1. The herein described process of plugging metallic castings, which consists in subjecting said castings alternately to vacuum and pressure in the presence of an acid, and then filling the pores and interstices thereof with a sulfate insoluble in water.

2. The herein described process of plugging metallic castings, which includes subjecting said castings to alternate pressure and vacuum in the presence of a pore-filling mineral salt insoluble in water.

3. The herein described process of closing the pores and interstices of metallic castings, which consists in exhausting the air from such pores and interstices and precipitating in the same a sulfate insoluble in water.

4. The herein described process of treating metallic castings, which consists in cleaning the pores and interstices thereof with a suitable acid under conditions of alternating vacuum and pressure, and precipitating a mineral compound in said pores and interstices.

5. The herein described process of closing the pores and interstices of metallic castings, which consists in subjecting the castings alternately to vacuum and pressure, and simultaneously precipitating in said pores and interstices a mineral compound insoluble in water.

6. The herein described process of closing the pores and interstices of metallic castings, which consists in subjecting the castings alternately to vacuum and pressure, and simultaneously precipitating calcium sulfate in said pores and interstices.

7. The herein described process of filling the pores of bronze castings which consists in cleaning the pores of said castings with sulfurous acid and subjecting said castings alternately to a vacuum and pressure in the presence of calcium bisulfite liquor containing calcium sulfate in suspension.

In testimony whereof I have affixed my signature, in presence of two witnesses.

ROBERT B. WOLF.

Witnesses:
JAMES F. SMITH,
ALFRED L. GILBERT.